UNITED STATES PATENT OFFICE.

JAMES H. CONNOR, OF NASHVILLE, TENNESSEE.

PROCESS OF MANUFACTURING AVAILABLE PHOSPHORIC ACID.

1,042,401.

Specification of Letters Patent.

Patented Oct. 29, 1912.

No Drawing.

Application filed October 21, 1911. Serial No. 655,963.

*To all whom it may concern:*

Be it known that I, JAMES H. CONNOR, a resident of Nashville, in the county of Davidson and State of Tennessee, have invented a new and useful Improvement in Processes of Manufacturing Available Phosphoric Acid, of which the following is a specification.

This invention relates to the treatment of phosphate rock, phosphate earth, phosphate pebbles, bone phosphate, lime and bones, and other phosphatic material, for the purpose of converting the insoluble phosphates contained therein into soluble phosphates, and thereby making the same available as fertilizers.

The invention is particularly applicable to the treatment of phosphate rock and other phosphatic materials which contain sandy matter or dirt and more or less alkali earths, and which for that reason have heretofore been unmarketable and unsalable. The invention, however, is applicable to the treatment of phosphatic materials of any kind.

The object of the invention is to provide for the treatment of such phosphatic materials, and particularly low-grade phosphate rocks and pebbles, in a manner to convert the insoluble phosphates therein into soluble and therefore available phosphoric acid, without the use of sulfuric acid, and at a comparatively low cost.

In carrying out the process the phosphate rock or other phosphatic material as it comes out of the ground and while in its crude state, and without washing or cleaning, is first dried and then ground, crushed or pulverized to such size that all portions thereof will be acted upon in the subsequent treatment thereof. The size to which it is reduced may vary, but it has been found that a size such as to pass through a sieve of 60 meshes to the inch gives excellent results. The ground, crushed or pulverized phosphatic material is then mixed with a suitable quantity of soda in the form of a carbonate, preferably the ordinary commercial soda ash. Soda ash is preferred on account, first, of its relatively low cost and second, because it converts a large percentage of the phosphoric acid into citrate soluble form. By using what is commercially known as sulfur soda ash, which contains sulfur as an impurity and is even cheaper than ordinary soda ash, the percentage of phosphoric acid rendered available is not only very high but is largely water soluble. The proportion of soda added to the crushed phosphatic material depends upon the character of the phosphatic material and the quantity of phosphoric acid contained therein and which is to be rendered available. Good commercial results have been obtained by using from 250 to 400 pounds of soda ash for each 1400 pounds of phosphatic material. To render a portion of the phosphoric acid water soluble there may be added to the mixture a quantity of iron oxid, preferably what is known as flue dust from blast furnaces. This causes the mixture to melt very rapidly in the kiln and produces a rapid reaction which renders a part of the phosphoric acid water soluble. From 25 to 50 pounds of flue dust is sufficient to add to the above named proportions of soda ash and pulverized rock. The mixture is then subjected to a comparatively high temperature for from about forty minutes to one hour, the temperature varying from 2000 to 3000 degrees Fahrenheit. Any form of furnace or kiln may be used for roasting the material, but it is preferred to use an ordinary rotary kiln on account of being thereby enabled to maintain a steady and uniform heat, and also because the action of the kiln keeps the material in fairly small lumps or globules, thereby insuring the thorough roasting of the mass throughout.

The mixture can be blown into the kiln in a dry form, but preferably it is treated in a wet state by adding water thereto in sufficient quantities to convert the mixture to the consistency of thick mud, the ingredients being thoroughly mixed after the water is added to convert the same into a uniform mass of substantially the consistency stated. This not only insures a thorough intermingling or more uniform mixture or distribution of the sodium carbonate with the phosphatic matter than if the materials were merely mixed in dry condition, but also results in the dissolved sodium carbonate soaking into or penetrating the particles of crushed phosphatic material, as a result of which the action of the re-agent is not only rendered more rapid but also produces a larger percentage of available phosphoric acid.

In the treatment of the wet mass in the kiln the wet material does not immediately disintegrate but remains in masses of greater or less size. This has a tendency to hold the volatile elements, such as the carbon monoxid and the carbon dioxid, in the mass and prevents their too rapid escape and therefore insures the thorough action of the sodium carbonate on the phosphates and particularly prevents the excessive volatilization of the sodium component. At the same time the action of the rotary kiln breaks the mass into lumps of sufficiently small size so that the entire mass is thoroughly roasted.

The application of a heat of the temperature specified and continued for substantially the time specified results in separating the phosphoric acid and rendering the same soluble and available. The result is a rather concentrated product, very rich in available phosphoric acid which is sufficiently separate and soluble to render the product available as a fertilizer.

The roasted mass comes out of the kiln in the form of small lumps somewhat resembling clinker. This is then ground, crushed or pulverized to such fineness as is desirable for fertilizing purposes, preferably to an impalpable powder or flour, and is then packed and ready for market without further treatment.

By means of the process described it is possible to form a high grade fertilizer, rich in available phosphoric acid, from cheap phosphatic rock, earth, pebbles and the like, which is found in large quantities in various parts of the country, mixed with various impurities, such as alkali earths, but which have not heretofore been available for fertilizing purposes on account of the cost of known processes for treating the same to render the phosphoric acid available, and which processes although expensive resulted in producing only a very indifferent fertilizer from such impure phosphate rocks and the like.

What I claim is:

1. The method of treating phosphatic material in order to render the insoluble phosphates available, consisting in reducing the phosphatic material to substantially a size to pass through a sieve of 60 meshes to the inch, adding thereto from 250 to 400 pounds of sodium carbonate for each 1400 pounds of phosphatic material, and water sufficient to reduce the mixture to the consistency of thick mud, thoroughly mixing the same, and subjecting the mud mass to a temperature of from 2000 to 3000 degrees Fahrenheit for such length of time that the phosphoric acid becomes soluble.

2. The method of treating phosphatic material in order to render the insoluble phosphates available, consisting in reducing the phosphatic material to substantially a size to pass through a sieve of 60 meshes to the inch, adding thereto sulfur soda ash in the proportion of 250 to 400 pounds of said soda ash to each 1400 pounds of phosphatic material, and then subjecting the same to a temperature of from 2000 to 3000 degrees Fahrenheit.

3. The method of treating phosphatic material in order to render the insoluble phosphates available, consisting in reducing the phosphatic material to substantially a size to pass through a sieve of 60 meshes to the inch, adding thereto soda ash in the proportion of 250 to 400 pounds of soda ash to each 1400 pounds of phosphatic material, then subjecting the same to a fusing temperature for such length of time that the phosphoric acid becomes soluble.

4. The method of treating phosphatic material in order to render the insoluble phosphates available, consisting in reducing the phosphatic material to substantially a size to pass through a sieve of 60 meshes to the inch, adding thereto soda ash in the proportion of 250 to 400 pounds of soda ash to each 1400 pounds of phosphatic material, and then subjecting the same to a temperature from 2000 to 3000 degrees Fahrenheit for a period of from 40 minutes to one hour.

5. The method of treating phosphatic material in order to render the insoluble phosphates available, consisting in reducing the phosphatic material to substantially a size to pass through a sieve of 60 meshes to the inch, adding thereto soda ash and oxid of iron, and subjecting the mixture to such temperature and for such length of time that the phosphoric acid becomes soluble.

6. The method of treating phosphatic material in order to render the insoluble phosphates available, consisting in reducing the phosphatic material to substantially a size to pass through a sieve of 60 meshes to the inch, adding thereto a sodium salt and oxid of iron in the proportion of 250 to 400 pounds of sodium salt and 25 to 50 pounds of oxid of iron to each 1400 pounds of phosphatic material, and then subjecting the mixture to a fusing temperature.

In testimony whereof, I have hereunto set my hand.

JAMES H. CONNOR.

Witnesses:
F. W. Winter,
Mary E. Cahoon.